US006992315B2

(12) United States Patent
Twerdochlib

(10) Patent No.: US 6,992,315 B2

(45) Date of Patent: Jan. 31, 2006

(54) IN SITU COMBUSTION TURBINE ENGINE AIRFOIL INSPECTION

(75) Inventor: Michael Twerdochlib, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 148 days.

(21) Appl. No.: 10/797,451

(22) Filed: Mar. 10, 2004

(65) Prior Publication Data

US 2005/0199832 A1 Sep. 15, 2005

(51) Int. Cl.
*G01V 8/00* (2006.01)

(52) U.S. Cl. .............. 250/559.08; 250/330; 356/237.2; 382/152; 382/284

(58) Field of Classification Search ..................... None
See application file for complete search history.

(56) References Cited

U.S. PATENT DOCUMENTS

| | | | | |
|---|---|---|---|---|
| 4,139,822 | A | 2/1979 | Urich et al. | |
| 5,148,667 | A | 9/1992 | Morey | |
| 5,164,826 | A | 11/1992 | Dailey | |
| 5,644,394 | A | 7/1997 | Owens | |
| 5,670,879 | A | 9/1997 | Zombo et al. | |
| 5,961,277 | A * | 10/1999 | Rubbers et al. | 415/118 |
| 6,062,811 | A | 5/2000 | Zombo et al. | |
| 6,072,568 | A | 6/2000 | Paton et al. | |
| 6,100,972 | A * | 8/2000 | Harley et al. | 356/241.1 |
| 6,150,656 | A | 11/2000 | Garrity | |
| 6,333,812 | B1 | 12/2001 | Rose et al. | |
| 6,414,458 | B1 * | 7/2002 | Hatley et al. | 318/568.12 |
| 6,487,909 | B2 | 12/2002 | Harrold et al. | |
| 6,570,175 | B2 | 5/2003 | Bales et al. | |
| 6,629,463 | B2 | 10/2003 | Naudet et al. | |
| 2003/0193331 | A1 | 10/2003 | Nath et al. | |
| 2004/0101023 | A1 * | 5/2004 | Choi | 374/141 |
| 2004/0128109 | A1 * | 7/2004 | Saito et al. | 702/185 |
| 2005/0073673 | A1 * | 4/2005 | Devitt et al. | 356/37 |
| 2005/0201611 | A1 * | 9/2005 | Lloyd et al. | 382/152 |

* cited by examiner

*Primary Examiner*—David Porta
*Assistant Examiner*—Davienne Monbleau

(57) ABSTRACT

A system (10) for imaging a combustion turbine engine airfoil includes a camera (12) and a positioner (24). The positioner may be controlled to dispose the camera within an inner turbine casing of the engine at a first position for acquiring a first image. The camera may then be moved to a second position for acquiring a second image. A storage device (30) stores the first and second images, and a processor (32) accesses the storage device to generate a composite image from the first and second images. For use when the airfoil is rotating, the system may also include a sensor (40) for generating a position signal (41) responsive to a detected angular position of an airfoil. The system may further include a trigger device (42), responsive to the position signal, for triggering the camera to acquire an image when the airfoil is proximate the camera.

24 Claims, 1 Drawing Sheet

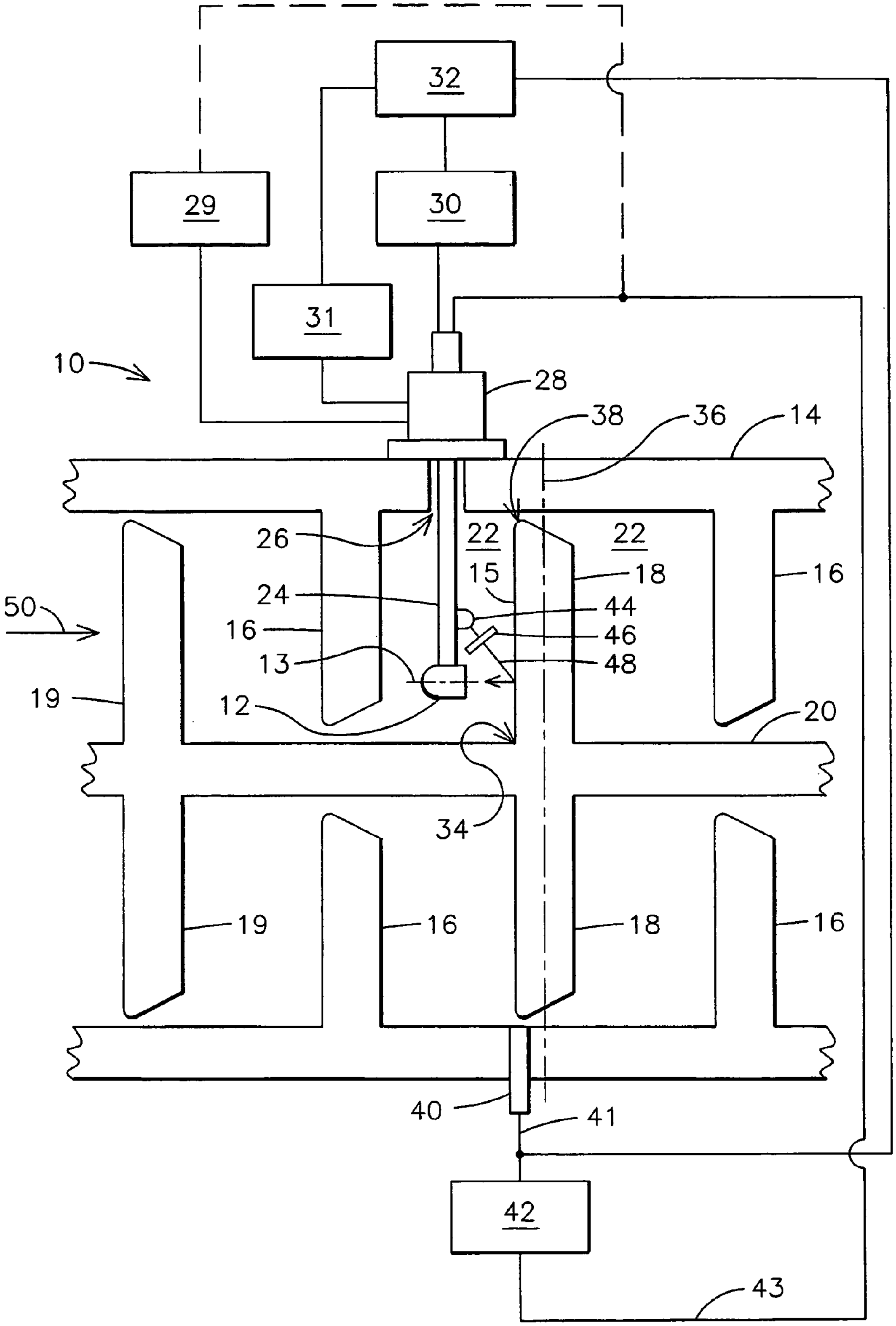
32
29
30
31
10
28
38
36
14
26
22
22
15
18
16
50
24
44
16
46
13
48
19
12
20
34
19
16
18
16
40
41
42
43

IN SITU COMBUSTION TURBINE ENGINE AIRFOIL INSPECTION

FIELD OF THE INVENTION

This invention relates generally to the field of power generation, and more particularly, to inspection of turbine blades in a combustion turbine engine.

BACKGROUND OF THE INVENTION

Thermal barrier coatings (TBCs) applied to turbine airfoils are well known in the art for protecting parts such as blades and vanes from elevated operating temperatures within a combustion turbine engine. However, TBCs are subject to degradation over their service life, and need to be inspected periodically to assess the integrity of the coating. In the past, inspection of coated turbomachinery components has been performed by partially disassembling the combustion turbine engine and performing visual inspections on individual components. In-situ visual inspections may be performed without engine disassembly by using a borescope inserted into a combustion turbine engine, but such procedures are labor intensive, time consuming, and require that the combustion turbine engine be shut down, and the rotating parts held stationary for the inspection. In addition, it has been proposed to image turbine blades with a sensor, such as an IR camera, positioned in a port in the inner turbine casing.

BRIEF DESCRIPTION OF THE DRAWINGS

The invention will be more apparent from the following description in view of the drawing that shows:

The sole FIGURE is a partial cross sectional schematic view of a turbine section of a combustion turbine engine having an image receptor disposed within the inner turbine casing for imaging turbine airfoils.

DETAILED DESCRIPTION OF THE INVENTION

The inventor has developed an innovative imaging system and imaging method for in-situ inspection of combustion turbine engine airfoils, such as turbine blades and vanes. Advantageously, an image receptor may be inserted into an inner turbine casing to provide a relatively close-up view, such as perpendicular to an axis or surface of an airfoil, thereby providing a higher resolution image than is possible, for example, by imaging the airfoil from a position in a port of the inner turbine casing. The invention allows imaging of the airfoil for improved resolution along lines of view within 40 degrees of normal to the axis of the airfoil, and, for more improved resolution, within 20 degrees of normal to the axis of the airfoil. The image receptor may be capable of receiving energy, such as electromagnetic energy or acoustic energy, and be capable of conveying information about the airfoil outside of the inner turbine casing. For example, the image receptor may be a camera that converts light to an electrical signal transmitted outside of the inner turbine casing, or a fiber optic or borescope that conveys light outside of the inner turbine casing. For example, the camera may include a focal pane array of the type used in a digital or video camera. In an aspect of the invention, the system may be automatically operated, for example, to periodically inspect the airfoils.

The FIGURE is a partial cross sectional schematic view of a turbine section of a combustion turbine engine showing a camera 12 disposed within an inner turbine casing 14, supported by an outer turbine casing (not shown), for imaging turbine airfoils, such as stationary vanes 16 and rotating blades 18. In a typical turbine section, rows of radially arranged vanes 16 are positioned within the inner turbine casing 14 and spaced apart along a longitudinal axis of the turbine section 10. Rows of radially arranged blades 18, attached to a shaft 20, are disposed in spaces 22 between the rows of vanes 16 and rotate therein when the combustion turbine engine is operated. The aforementioned components of the turbine section 10 are fairly typical of those found in the prior art, and other known variations of these components and related components may be used in other embodiments of the present invention.

As shown in the FIGURE, an innovative imaging system 10 includes an image receptor, such as a camera 12, attached to a positioner 24, for extending the camera 12 through an opening 26 (such as a port or valve) in the inner turbine casing 14 and positioning the camera 12 to image an airfoil. The positioner 24 may be inserted radially into the inner turbine casing, so that an orientation of a radial axis of the positioner 24 has at least a radial component with respect to the shaft 20. In another aspect of the invention, the positioner 24 may be rotated about its radial axis when inserted within the inner turbine casing 14. The positioner 24 may be manipulated manually, or it may be electro-mechanically operated. For example, a drive mechanism 28 may be used to operate the positioner 24 to extend the camera into the inner turbine casing 14, position the camera appropriately to image the airfoil, and withdraw the camera 12 from the casing 14. The drive mechanism 28 may include a stepper motor driving a threaded rod, or a telescoping assembly similar to a motor-driven automobile antenna application. In addition, the drive mechanism 28 may be used to rotate the positioner 24 about the positioner radial axis. For example, the drive mechanism 28 may include a second motor in communication with the positioner 24, such as through a gear drive, to rotate the positioner 24 and the camera 12 attached to the positioner 24. A controller 29 may be provided to control the positioner 24, for example, via the drive mechanism 28, to move the camera 12 to acquire desired images of the airfoil. In an aspect of the invention, the camera 12 may be extended into the space 22 between the row of vanes 16 and the row of blades 18 when the combustion turbine engine has been taken offline and the shaft 20 is stationary, or when the shaft 20 is being rotating at a turning gear or spin cool speed.

The camera 12 may be positioned upstream (with respect to a direction of flow 50 through the turbine section) of the blades 18, as shown in the FIGURE. Accordingly, the camera 12 may be pointed downstream to image an upstream side of the blades 18, or pointed upstream to image a downstream side of the vanes 16, for example, by rotating the camera 12 180 degrees about a positioner longitudinal axis. When positioned to point upstream, the camera 12 may also be directed to image an upstream set of blades 19 through gaps between the set of vanes 16. In another embodiment, the camera 12 may be positioned in the space 22 downstream of the blades 18 to image the downstream side of the blades 18, or the upstream sides of the vanes 16. During combustion turbine engine operation, the camera 12 may be withdrawn from the casing 14 and the opening 26 plugged or otherwise sealed.

Advantageously, the camera 12 may be disposed within the inner turbine casing 14 so that a camera line of view, or imaging axis 13, is generally perpendicular (such as within 20 degrees from normal) to an axis 36 of the airfoil, or to a surface 15 of the airfoil being examined. In an aspect of the invention, the camera 12 may be rotated to so that the camera axis 13 is generally aligned with a normal (such as within 20 degrees from the normal) extending from a curved portion of an airfoil. For example, a curved contour of a blade may be tracked as the blade 18 passes the camera 12 by sensing a position of the blade 18 and aiming the camera 12 normally to the blade 18 according to a known geometry of the blade 18 at the sensed position. Such aiming may be performed automatically. Accordingly, an image may be acquired having a higher resolution and less distortion than an image acquired by imaging the airfoil from a position proximate the inner turbine casing opening 26.

In another aspect of the invention, the camera 12 may be positioned at multiple locations to acquire different images of the airfoil to allow generating a composite image of the entire airfoil from the multiple images. For example, the camera 12 may be positioned by the positioner 24 at a first position for acquiring a first image of a portion of the airfoil. Next, the positioner 24 may move the camera 12 to a second position for acquiring a second image, so that the edges of the first and second images at least abut, and may partially overlap each other, thereby allowing a single composite image to be generated. For example, an image assembly technique similar to techniques used in satellite imagery to create composite terrain maps may be employed. A storage device 30, such as a random access memory, a hard disk drive, or a recordable compact disk, in communication with the camera 12, may be used to store each image acquired by the camera 12. A processor 32, in communication with the storage device 32, may access the images stored on the storage device 30 to generate a composite image from the stored images. It should be understood that the number of images required to generate a single composite image of an airfoil, such as a single turbine blade, may vary depending on factors such as the size of the airfoil being imaged, the image footprint of the camera on the airfoil, and the degree of edge overlap desired for adjacent images. A position sensor 31 may be provided to sense a radial position of the camera 12 within the inner turbine casing 14 when the camera 12 captures an image of the blade 18. A sensed radial position of the camera 12 for each image captured may be provided to the processor 32 to allow the processor to correlate each image acquired to a respective portion of the blade 18 imaged. As a result, the correlated images may be assembled in an appropriate spatial relationship to form a composite image of the blade 18.

In an embodiment of the invention, the processor 32 may direct the positioner 24 to move the camera 12 to a radial position, r, within the turbine casing. The camera 12 may then be triggered to acquire an image at a detected angular orientation, $\Theta$, of the shaft 20. Accordingly, the polar coordinates (r, $\Theta$) may be recorded for each image acquired. Thus, the processor 32 may be configured to combine multiple images into a composite image of a blade 18 and to associate the composite image with a certain blade 18 on the shaft 20 by correlation with the detected angular orientation, $\Theta$. In an aspect of the invention, $\Theta$ may be determined by using a phasor signal, such as a signal generated once for each revolution of the shaft. By comparing the time elapsed from receipt of the phasor signal to a known time period required for one revolution, the angular orientation, $\Theta$, of the shaft with respect to the angular orientation of the shaft when the phasor signal was received may be generated. For example, if it takes 200,000 time units for a single revolution of the shaft, triggering the camera 12 at 100,000 elapsed time units after the phasor signal is received (or half the time required for a complete revolution) may capture an image of the 50th blade if, for example, there were 100 blades 18 in a row.

To image a single airfoil, such as a turbine blade 18, the shaft 20 may be held stationary and the camera 12 radially inserted into the space 22 between the rows of vanes 16 and the row of blades 18, to a position proximate a root 34 of the blade 18 so that the camera 12 is aimed substantially perpendicular to the axis 36, or surface 15, of the blade. An image of a first portion of the blade 18 adjacent the root 34 may then be acquired. Next, the camera 12 may be withdrawn radially away from the root 34 to a new location so that the camera 12 is positioned to acquire an image of a second portion of the blade 18 adjacent to the first portion. In this manner, the camera 12 may be moved through the space 22 by the positioner 24 while sequentially acquiring adjacent images of portions of the turbine blade 18. In another embodiment, images may be acquired by inserting the camera 12 to a position proximate the tip 38 of the blade 18 and acquiring sequentially adjacent images of portions of the turbine blade 18 as the camera 12 is moved radially inwardly toward the root 34 of the blade 18.

In another aspect, the imaging system 10 may be used to image blades 18 while the rotor 20 is rotating, such as at turning gear or spin cool speeds. The system may include a sensor 40 to detect an angular position of a blade 18 and generate a position signal 41 responsive to the detected angular position. For example, an eddy current probe may be used to sense passage of the turbine blade 18. In other embodiments, a shaft encoder sensor or speed wheel type shaft rotation sensor may be used to sense a blade 18 position. In yet another embodiment, a shaft phasor sensor, generating a phasor signal for each revolution of the shaft, may be used. The position signal 41 generated by the sensor 40 may be provided to a trigger device 42 for triggering the camera 12 to acquire an image when the blade 18 is proximate the camera. Accordingly, triggering of the camera 12 may be synchronized so that a desired blade may be imaged. Optionally, the trigger device 42 may communicate with the controller 29 to coordinate the positioning of the camera 12 (as described above, for example, to acquire sequential adjacent images) with the arrival of a blade to be imaged. In another aspect, a row of blades 18 may be concentrically imaged before repositioning the camera 12. For example, a portion of each of the blades 18 in a row may be imaged before the camera is moved to image an adjacent portion of each of the blades 18 in the row. The images may be saved in the storage device 30 and accessed by the processor 32 to create respective composite images of each of the blades 18 in the row. In yet another aspect, the position signal 41 may be provided to the processor 32 to allow correlating an acquired image to an angular blade position. Accordingly, an angular position of a blade 18 when an image is acquired may be sensed in conjunction with a sensed radial position of the camera 12 so that a composite image of the blade 12 may be constructed by correlating each acquired image with an angular position of the blade 18 and a radial position of the camera 12 and assembling the acquired images in an appropriate spatial relationship to form a composite image of the blade 18. For example, polar coordinates (r, $\Theta$) may be used to represent the radial position, r, of the camera 12, and the angular position, $\Theta$, of the blade 18.

In yet another aspect, the imaging system 10 may also include an illumination source 44, for example, attached to the positioner 24, for illuminating the airfoil. The illumination source 44 may include an incandescent light, a fluorescent light, a xenon strobe, a laser, a light emitting diode (LED), a semiconductor laser, and/or a fiber optic light source. In an aspect of the invention, the strobe may be triggered by the trigger device 42, instead of the trigger device 42 triggering the camera 12 to acquire an image. The illumination source 44 may be positioned to illuminate the airfoil at an angle of incidence selected to highlight potential defects in the TBC of the airfoil. For example, the illumination source 44 may be positioned relatively close to the camera 12 and aimed at the airfoil at a relatively small angular displacement (such as less than about 30 degrees) from an image axis 13 of the camera 12. In another aspect, the illumination source 44 may be positioned relatively far from the camera 12 and aimed at the airfoil at a relatively large angular displacement (such as more than about 60 degrees) from an image axis 13 of the camera 12. Accordingly, TBC defects that may not be as readily detected at relatively high angles of incidences on the airfoil may be discernable at relatively low angles of incidences, and vice versa.

In another aspect, different wavelengths of light may be used for illuminating the airfoil to aid in detection and identification of TBC defects. For example, red light, having a wavelength from about 780 to 622 nanometers (nm), orange light (622 to 597 nm), yellow light, (597 to 577 nm), green light (577 to 492 nm), blue light (492 to 455 nm), and violet light (455 to 390 nm), or combinations of these colors may be used for illumination. In addition, electromagnetic radiation wavelengths outside of the visible light range may be used. Certain colors (that is, wavelengths), or combinations of colors, may allow a defect to be detected more easily than another color. Accordingly, the illumination source 44 may be configured to emit light having a desired wavelength, such as one of the colors described above. In another aspect, a filter 46 may be used to filter the light generated by the illumination source 44 to only allow light having a desired wavelength to pass through the filter 46. The filter 46 may be positioned in an illumination light path 48, such as proximate the illumination source or proximate the camera 12, to filter the light produced by the illumination source 44 before it impinges on the camera 12.

In yet another aspect, two or more different wavelengths of light may be used to separately illuminate the airfoil to allow processing of an airfoil image based on different illumination wavelengths. For example, a first version of an airfoil image may be acquired when illuminating the airfoil at a first wavelength of light. A second version of the image at a second wavelength of light different from the first wavelength may then be acquired. The first and second versions of the acquired images may then be processed to extract image details, such as defects in the TBC. For example, the corresponding pixels of the first and second images may be subtracted from each either to establish the differences between the two images, thereby improving identification of defects. Alternatively, the corresponding pixels of the first and second images may be added to each other to highlight defects. Accordingly, imaging using two or more frequencies of electromagnetic energy may allow improved defect identification to be achieved.

In yet another embodiment, the image receptor may include an electromagnetic energy detector that converts received electromagnetic energy into an electrical signal. For example, the electromagnetic energy detector may include an infrared (IR) detector for sensing electromagnetic energy comprising a wavelength in an infrared spectrum, such as electromagnetic energy having a wavelength from about 0.01 centimeters to 780 nanometers. In contrast to a camera 12 comprising an array of detectors imaging a portion of a blade 18, a single detector may receive energy from a relatively smaller portion of the blade 18, such as a spot of electromagnetic energy focused on the blade, than a portion imaged by an array of detectors. Electromagnetic energy radiated or reflected from the spot, such as a circular area, on the blade 18 may be focused, for example, by a lens, onto the detector. For example a laser diode or laser in communication with a fiber optic cable may be used in conjunction with a lens to focus electromagnetic energy in a spot to control an effective resolution of the composite picture—the size of the spot becomes the size of the pixel in the resulting composite image. Advantageously, illumination energy may be focused on the spot, thereby providing a higher intensity of electromagnetic energy for the detector to gather than if the electromagnetic energy is spread over a larger area than the spot. In response to the electromagnetic energy received from the spot, the detector creates a voltage or current signal proportional to the intensity of the electromagnetic energy received. As the blades 18 rotate, the focused spot may be swept across an arcuate portion of each blade 18. The voltage or current signal provided by the detector for each spot, or pixel, may be stored in the storage device 30, for example, as a digital representation of a gray scale from a minimum light condition, such as black, to a maximum light condition, such as white. The stored pixel may be provided to the processor 32 and correlated with respective radial positions of the detector and angular positions of the imaged blades 18 for each spot detected. The detector may be withdrawn from the space 22 as the blades 18 rotate, thus receiving energy from a sufficient number of spots by the respective detectors to cover desired surface areas of the blades 18. For example, the blades 18 may be imaged in a spiral path of spots or concentric circles of spots from the blade root 34 to the blade tip 38. The processor 32 may then construct a composite image of each blade using, for example, the detector voltage or current for each of the spots and its associated radial and angular position, such as polar coordinates $(r, \Theta)$ associated with each image.

In an aspect of the invention, a linear array of detectors, such as a radially oriented linear array, may be used to image the blades 18. Accordingly, a radially arranged line of spots of electromagnetic energy may be focused on the blade, and electromagnetic energy reflected from the line of spots on the blades may be scanned as the blades 18 rotate. As a result, a detector withdrawal speed may be increased compared to using a single detector because more surface area may be covered using a linear array, thereby reducing an imaging time to image all the blades 18. The detectors in a linear array need not be positioned adjacent each other so that their respective detection spots abut or overlap, but the detectors may be spaced apart. A detection area gap between the spaced detectors may be compensated for by withdrawing the array from the space 22 until the detection gaps between the detectors have been covered by moving detectors across the gaps left undetected at a prior array position. Once the gaps have been covered, the array may then be withdrawn a distance corresponding to a length of the array to image another portion of the blade 18. This technique may be repeated until the entire blade surface has been covered.

In another aspect, the detector, or linear array of detectors, may be rotated about the positioner longitudinal axis as each blade 18 passes so that the detector's imaging axis is positioned perpendicularly, or at least within 40 degrees of perpendicular, to the blade's 18 surface. For example, a blade leading edge typically includes a curved contour, requiring that the detector be rotated to maintain a perpendicular relationship with the contour of the leading edge. An orientation of the detector may be controlled to ensure that the detector is rotated to be positioned perpendicular to the surface contour of the blade 18 as the blade passes. After a blade passes, the detector may be rotated back to an initial position to acquire an image of the next blade in a perpendicular relationship to the next blade surface. This technique allows the leading edge of the blade to be viewed, followed by a flat surface of the blade that may be angled away for the detector, with less distortion than if the detector was fixed at a single angular position with respect to the blades. Accordingly, an image of the blade constructed by the processor 32 may advantageously show a curved blade portion, such as the blade leading edge, as a flattened, projected image with improved resolution compared to viewing the leading edge from a single angular position.

In a further aspect of the invention, the spot, or line of spots, if an array of detectors is used, may be illuminated. Accordingly, a laser, such as an LED or semiconductor laser, or array of lasers, may be used for focused spot illumination at a higher illumination intensity than if the illumination was spread over a portion of the blade 18 larger than a desired spot size. As a result, the laser illumination footprint on the blade determines the blade spot size. For example, an IR laser diode or IR LED, and an IR detector may be used to image the blades 18. Advantageously, IR radiation wavelengths may be capable of penetrating through a TBC to image a bond coat between the blade metal and the TBC to allow detection of bond coat defects. In another aspect, two IR lasers radiating IR energy at two different wavelengths may be used in conjunction with addition and subtraction processes as described earlier to detect TBC and bond coat defects.

In yet another aspect, compensation of detected electromagnetic energy intensities may be performed based on distances between a blade surface and the detector. For example, the farther the detector is positioned with respect to the blade 18, the less the light intensity that may be captured by the detector. Hence, the portions of the blade 18 imaged that are farther from the detector than closer portions may have a reduced intensity, even if the illumination and surface reflectance of the farther away portions remain the same. To provide such compensation, the processor 32 may be configured to identify a detector distance from the blade 18 based on a radial position of the detector, an angular position of the blade, and information regarding a blade geometry (for example, stored in the storage device 30). Using these parameters, the processor 32 may adjust a detected spot intensity to compensate for changing distances of the detector from the blade surface.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A system for imaging an airfoil within a combustion turbine engine comprising:

an image receptor;

a radial positioner extending through an opening in an inner turbine casing of the engine and disposing the image receptor within the casing at a first position for acquiring a first image and at a second position for acquiring a second image;

a storage device storing the first and second images; and a processor accessing the storage device to generate a composite image from the first and second images.

2. The system of claim 1, wherein the radial positioner further comprises a drive mechanism for rotating the radial positioner about a radial axis.

3. The system of claim 1, further comprising a sensor generating a position signal responsive to a radial position of the image receptor within the turbine casing.

4. The system of claim 1, further comprising:

a sensor generating a position signal responsive to a detected angular position of the airfoil as the airfoil rotates about a shaft within the turbine casing; and a trigger device, responsive to the position signal, for triggering the image receptor to acquire an image when the airfoil is proximate the image receptor.

5. The system of claim 1, further comprising a controller actuating the positioner to move the image receptor from the first position to the second position.

6. The system of claim 1, further comprising an illumination source attached to the positioner for illuminating the airfoil.

7. The system of claim 6, wherein the illumination source is selected from the group consisting of an incandescent light, a fluorescent light, a xenon strobe, a light emitting diode, a laser diode, and a fiber optic light source.

8. The system of claim 6, wherein the illumination source is configured to emit electromagnetic energy comprising a desired wavelength.

9. The system of claim 6, wherein the desired wavelength comprises an infrared wavelength.

10. The system of claim 6, further comprising a wavelength filter disposed in a illumination path from the illumination source to the image receptor.

11. The system of claim 1, wherein the image receptor comprises an infrared detector capable of sensing electromagnetic energy comprising an infrared wavelength.

12. A method for imaging an airfoil within a combustion turbine engine comprising:

disposing an image receptor within an inner turbine casing of the engine at a first position;

acquiring a first image of the airfoil at the first position;

moving the image receptor to a second position within the inner turbine casing of the engine;

acquiring a second image at the second position; and generating a composite image from the first and second images.

13. The method of claim 12, wherein the first and second positions are along respective lines of view perpendicular to an axis of the airfoil.

14. The method of claim 12, wherein the first and second positions are along respective lines of view perpendicular to a surface of the airfoil.

15. The method of claim 12, further comprising:

sensing respective radial positions of the image receptor when acquiring the first image and the second image; and correlating respective sensed radial positions with the first image and the second image.

16. The method of claim 12, further comprising:

detecting an angular position of the airfoil relative to its axis of rotation; and triggering the image receptor to acquire an image when the airfoil is proximate the image receptor based on the angular position.

17. The method of claim 12, further comprising:

detecting angular positions of the airfoil relative to its axis of rotation when acquiring the first image and the second image; and correlating respective detected radial positions of the airfoil with the first image and the second image.

18. The method of claim 12, further comprising:

disposing an illumination source within an inner turbine casing the engine; and illuminating the airfoil while acquiring an image.

19. The method of claim 18, further comprising illuminating the airfoil at an angle of less than about 30 degrees with respect to an axis of the airfoil.

20. The method of claim 18, further comprising filtering light reflected from the airfoil to receive a desired wavelength of the light at the image receptor.

21. The method of claim 20, wherein the wavelength of light is selected from the group consisting of a wavelength corresponding to red, blue, and green light.

22. The method of claim 12, further comprising:

acquiring a first version of the first image using a first wavelength of electromagnetic energy;

acquiring a second version of the first image using a second wavelength of electromagnetic energy different from the first wavelength; and processing the first and second versions of the first image to extract image details.

23. The method of claim 22, wherein processing further comprises a subtractive process between the versions.

24. The method of claim 22, wherein processing further comprises an additive process between the versions.

* * * * *